L. A. HUFFERD.
APPARATUS FOR SUPPLYING RECEPTACLES WITH LIQUID.
APPLICATION FILED NOV. 13, 1916.
1,241,982. Patented Oct. 2, 1917.
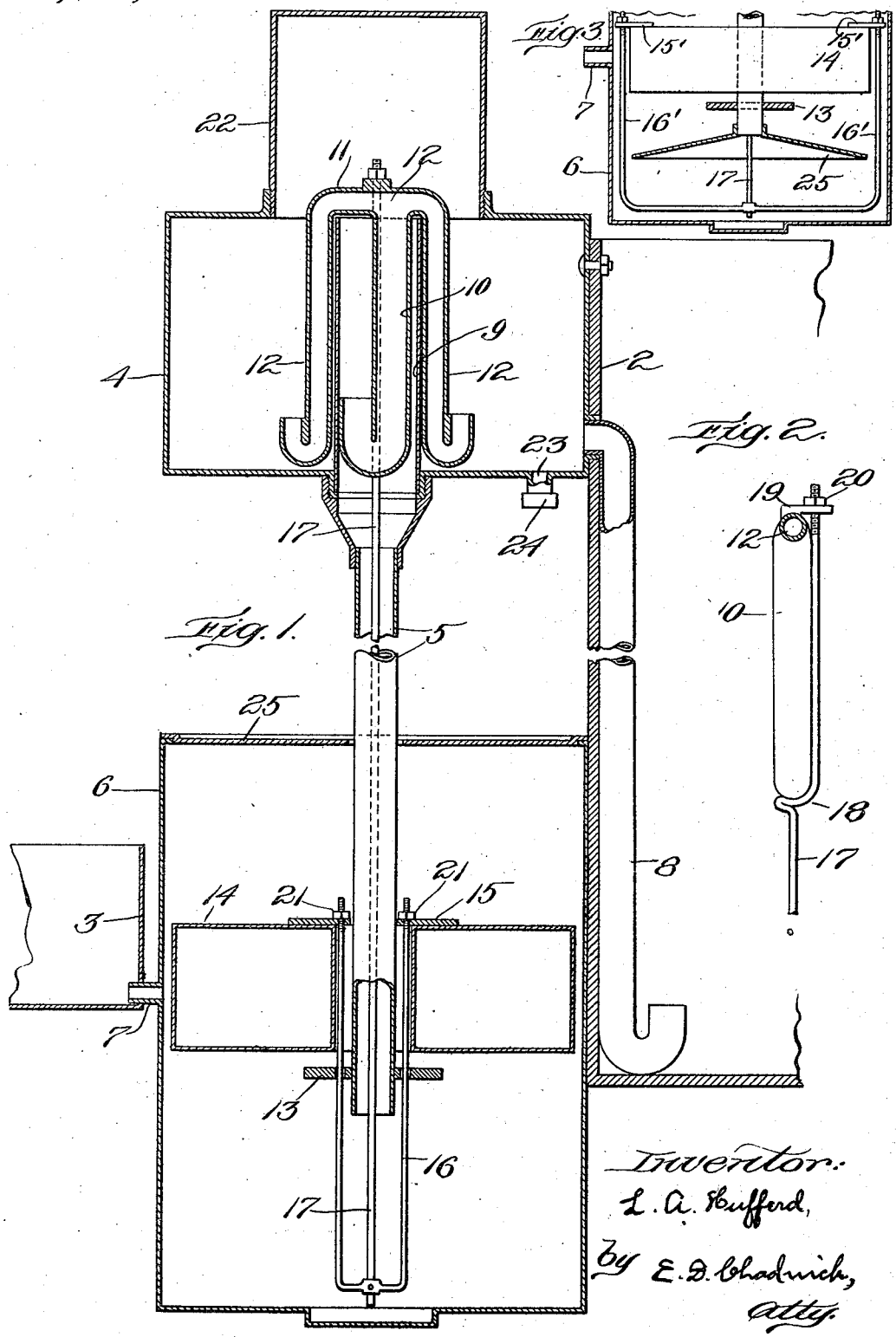

UNITED STATES PATENT OFFICE.

LOT A. HUFFERD, OF DETROIT, MICHIGAN.

APPARATUS FOR SUPPLYING RECEPTACLES WITH LIQUID.

1,241,982.          Specification of Letters Patent.          Patented Oct. 2, 1917.

Application filed November 13, 1916.   Serial No. 130,964.

*To all whom it may concern:*

Be it known that I, LOT A. HUFFERD, a citizen of the United States, residing at Detroit, in the county of Wayne and State of Michigan, have invented certain new and useful Improvements in Apparatus for Supplying Receptacles with Liquid, of which the following is a specification.

My invention is intended to provide an automatic apparatus by means of which a receptacle may be kept filled with liquid to a substantially constant level from another receptacle in which the level of the liquid is subject to variations so great that they could not be reproduced in the supplied receptacle. The utility of my invention, which may be employed in various relations, may be exemplified by assuming that it is desired to keep a hog trough, chicken trough or similar relatively shallow receptacle constantly supplied with water from another receptacle, such as a horse trough, for instance, which is too deep to serve for watering hogs or chickens and in which the level of the water is liable to be anywhere between the top and bottom of the trough. In such case, by interposing between the two receptacles an apparatus embodying my invention, the deeper trough may be caused to supply the shallower trough in such manner that whatever the variations in the level of the water in the deeper trough may be, they will affect the level of the water in the shallower trough so slightly that the variations therein will be well within the capacity of the latter trough.

An embodiment of my invention is illustrated in the accompanying drawing, in which, Figure 1 is mainly a sectional elevation of the principal parts employed, as preferably constructed;

Fig. 2 is a sectional elevation illustrating a detail of the construction; and

Fig. 3 is a sectional view, drawn to a smaller scale, in which is shown a modification.

In the drawing, 2 indicates a portion of the supply receptacle, which may be assumed to be a tank or trough of considerable depth, and 3 indicates a portion of the receptacle to be supplied, which may be assumed to be a relatively shallow trough wherein it is desired to maintain a supply of water at a substantially constant level. It is also to be assumed that the supply receptacle 2 is filled with water from time to time but that the water level therein is subject to wide variations, such as would result from occasional consumption of the water by horses or cows, for example. The apparatus connecting the two receptacles 2 and 3 comprises an upper tank 4 which is secured to one end of the receptacle 2 or otherwise maintained in fixed position and from which a pipe 5 extends downward into a lower tank 6, which is also fixed in position and is connected by an open pipe 7 with the receptacle 3, preferably at or near the bottom of the latter. Another pipe 8 connects the receptacle 2 with the tank 4, preferably at or near their bottoms, and although in the drawing the receptacles 2 and 3 are shown in close proximity to the tanks 4 and 6 respectively they may be located in practice at any desired distances from said tanks.

Above the pipe 5 is located another upright open-ended pipe 9 which is carried by the tank 4 and passes through a perforation in the bottom thereof, so that said pipes constitute in effect a single pipe and provide a continuous passage extending upward through the bottom of the tank, the connection between the pipes and the tank being water-tight. The upper end of the pipe 9 is located above the highest level reached by the water in the tank 4, and within said pipe is located one leg 10 of a siphon 11 which passes over the upper end of the pipe 9 and has its outer leg or legs 12 located in the tank 4, so that no water can flow from the tank 4 into the pipe 5 except through the siphon and the pipe 9 which contains its inner leg. In the construction illustrated the siphon is provided with two outer legs 12 in order to give it sufficient symmetry to substantially balance its weight with respect to its support hereinafter described, and the lower ends of its several legs are upturned in order to keep the siphon full after it has once been primed.

The open lower end of the pipe 5 extends downward into the tank 6 to a point somewhat below the pipe 7 and is preferably given lateral support by causing it to pass through a fixed cross piece 13 carried by the walls of tank 6. Above this cross piece is located a float 14 which has a central opening through which the pipe 5 passes freely and carries a top plate 15 from which is suspended a stirrup 16, the upright arms of which pass freely through perforations in the cross piece 13 and through the central opening in the float. To the bottom of this stirrup is secured the lower end of a rod 17, extending upward through the pipes 5 and 9 and carrying the siphon 11, which is detachably secured to the upper end of said rod in any suitable manner. For example, in Fig. 2 the rod 17 is shown as bent laterally at 18 to provide a seat for the bottom of the inner leg 10 of the siphon, from which seat said rod extends upward through a loop 19 projecting laterally from the top of the siphon and confined beneath a nut 20 screwed onto the threaded upper end of the rod. Thus the siphon will rise and fall with the float 14, and provision is made for relative adjustment of these parts in a vertical direction, preferably by threading the upper ends of the arms of the stirrup 16 and providing them with nuts 21 adapted to rest on the plate 15.

A space adapted to receive the siphon 11 when elevated by the float 14 is provided by means of a hollow cap 22 detachably secured by screw threads or otherwise to the top of the tank 4 and surrounding an opening therein through which the siphon can be removed bodily, the connection between the tank 4 and the cap 22 being air tight. 23 indicates an aperture in the bottom of the tank 4 which is normally closed by a screw cap 24, and through which the tank can be drained or any sediment contained therein can be removed, and 25 indicates a loose cover for the tank 6, with a perforation therein through which the pipe 5 passes freely, the water in said tank being exposed to the normal atmospheric pressure.

The apparatus is shown in the drawing with no water in any of the receptacles and with the siphon 11 and the float 14 in the lowermost position of the combined parts, in which they are supported either by the siphon resting on the upper end of the pipe 9 or by the float resting on the cross piece 13, according to the relative adjustment of the siphon and float. The apparatus may then be put in condition for use by first removing the cap 22, then disconnecting the siphon 11 from its supporting rod 17 and priming the siphon by filling it with water, then replacing the primed siphon on the rod and connecting it thereto and then filling the receptacle 2, the operation thereafter being as follows: As the water rises in the receptacle 2 it flows upward through the pipe 8 and eventually enters the tank 4, and as soon as it rises therein above the upturned lower end of inner leg 10 of the siphon it flows through the siphon and the pipes 9 and 5 into the tank 6, where it rises until it reaches the pipe 7 and flows into the receptacle 3. As soon as the water level in the tank 6 reaches a certain point, however, it begins to lift the float 14 and the siphon 11 with it, and said siphon and float are located at such a vertical distance from each other that when the water level in the receptacle 3 reaches the desired point the siphon is elevated to a position in which the upturned lower end of the inner leg 10 of the siphon is level with the surfaces of the water in the tank 4 and receptacle 2, with the latter filled to the maximum extent. The flow through the siphon then stops and a condition of equilibrium is reached, whereupon the cap 22 is replaced and the air contained therein and in the top of the tank 4 is thereby trapped, the lower end of the pipe 5 being sealed by the water therein. The condition of equilibrium thus established continues so long as the water levels in the receptacles 2 and 3 remain unchanged, but if the water in the receptacle 3 is lowered by consumption or otherwise, water flows from the tank 6 into said receptacle and the float 14 is lowered accordingly, thereby lowering the siphon 11 to a corresponding extent and causing a further flow to take place from the tank 4 into the tank 6 and from the receptacle 2 into the tank 4 until a condition of equilibrium is again reached, as above described. Hence it follows that if the receptacle 2 is kept filled to the maximum extent the water in the receptacle 3 will be maintained at a constant predetermined level.

It remains to consider what occurs when the level of the water in the receptacle 2 is lowered. As such level falls, water flows from the tank 4 into said receptacle, but since the air in the tank is trapped the fall of the water level therein creates a partial vacuum which causes water from the tank 6 to rise by suction in the lower end of the pipe 5. A condition of equilibrium is reached, however, as soon as the head of the water elevated in the pipe 5 with respect to the level of the water in the tank 6 becomes sufficient to balance the head of the water in the tank 4 with respect to the lowered level in the receptacle 2, since the partial vacuum acts equally on both bodies of water, and thereupon the flow from the tank 4 into the receptacle 2 ceases. But although the rise of water in the lower end of the pipe 5 results in a lowering of the water level in the tank 6 and receptacle 3, the change of level in said receptacle 3 is only a fraction of the change of level in the receptacle 2, because the latter change of level is balanced by the rise of water in the lower end of the pipe 5 and such rise is much greater in extent than the concurrent fall of the water level in the tanks 4 and 6, the cross-sectional area of said pipe being much less than the net areas of said tanks; consequently, by suitably proportioning said areas the fall of the water level in the receptacle 3 can be restricted to any desired extent, regardless of the extent to which the water level in the receptacle 2 falls. If the receptacle 2 is filled again after having been partially emptied, the operation is the reverse of that above described, the partial vacuum in the tank 4 and the head of water in the pipe 5 being reduced until a condition of equilibrium is reached.

If the net cross-sectional areas of the tanks 4 and 6 are about the same, as in the construction illustrated, any fall of the water level in the tank 4 which is due to a fall of the level in the receptacle 2 will be a little greater than the resulting fall of the level in the tank 6, because the latter has the receptacle 3 to draw from, and consequently the level in the tank 4 may fall slightly below the upturned lower end of the leg 10 of the siphon. In such case, consumption of water from the receptacle 3 will not produce a flow through the siphon until said siphon has been slightly lowered by the float 14, but thereafter said receptacle 3 will be kept supplied with water in the manner already explained. It follows that when the water level in the receptacle 2 falls the ratio of the resulting fall of level in the receptacle 3 to the fall of level in the receptacle 2 will be equal to the ratio of the cross-sectional area of the pipe 5 to the net cross-sectional area of the tank 4, which ratio will be determined for each specific apparatus in accordance with the depth of the receptacle 3. The normal or highest level in the receptacle 3 will be determined by the relative vertical adjustment of the siphon 11 and float 14, and the length of the pipe 5 will be determined in accordance with the extent to which the water level in the receptacle 2 is liable to vary, since one of the functions of said pipe is to contain a water column such as will compensate for a lowering of said water level. In case the water in the receptacle 2 should fall to such an extent as to cause the water in the pipe 5 to rise above the level of the upturned end of the leg 10 of the siphon, the parts will then contain a continuous body of water extending from one receptacle to the other and will operate under such conditions as a simple siphon, with the result that any change in the level of the water in either receptacle will cause a flow from the other receptacle until the water reaches the same level in both.

In the modification shown in Fig. 3 the lower end of the pipe 5 has a shallow downwardly-facing funnel 25 detachably secured thereto and the arms 16′ of the stirrup which supports the rod 17 extend upward past the outer edges of the float instead of through its central opening, thereby providing a space for the reception of the funnel, the purpose of which is to prevent any air which may be carried down through the pipe 5 by the falling water therein from escaping through the tank 6 and thereby diminishing the body of air intended to be maintained in the upper part of the tank 4. The funnel operates by collecting the air bubbles when they rise after reaching the comparatively still portions of the water in the tank 6 and guiding them into the lower end of the pipe 5, through which they pass upward into the tank 4 as soon as the flow of water through said pipe ceases.

Instead of putting the apparatus in operation in the manner above described, this may be done by first plugging the upturned lower end of the pipe 8, then filling the receptacle 2 to a point slightly above the plugged end of said pipe, then removing the cap 22, and then filling the tank 4 to a level corresponding with the maximum level in the receptacle 2, then filling the tank 6 to the top of the discharge pipe 7, then removing, priming and replacing the siphon, then immediately replacing the cap 22, and then removing the plug from the pipe 8, whereupon the receptacle 2 can be filled to any desired extent and the apparatus will operate in the manner already explained.

It is an important advantage of the apparatus above described that although it includes a species of float feed for controlling the level of the liquid in the receptacle 3 it is wholly free from mechanical valves and other parts which might give trouble by becoming clogged or otherwise getting out of order, the only moving part being that composed of the combined siphon and float and their connections. It also has the advantages that its parts are simple, are easily adjustable in so far as adjustment is required, and constitute a structure which is practically independent of the receptacles between which it is interposed, so that it can be combined with existing receptacles without difficulty.

I claim:

1. An apparatus of the character described, comprising an upper tank having its top portion closed and also having an inlet adapted to be connected to a supply receptacle, a lower tank having an outlet adapted to be connected to a receptacle to be supplied, an open-ended pipe connecting said tanks and having its upper end located above the level of the liquid in the upper tank and its lower end located below the level of the liquid in the lower tank, and means controlled by the rise and fall of the liquid in the lower tank for regulating the flow from the upper tank into said pipe.

2. An apparatus of the character described, comprising an upper tank having its top portion closed and also having an inlet adapted to be connected to a supply receptacle, a lower tank having an outlet adapted to be connected to a receptacle to be supplied, an open-ended pipe connecting said tanks and having its upper end located above the level of the liquid in the upper tank and its lower end located below the level of the liquid in the lower tank, a float movable with the rise and fall of the liquid in the lower tank, and a siphon carried by said float and arranged to convey liquid from the upper tank into said pipe.

3. An apparatus of the character described, comprising an upper tank having its top portion closed and also having an inlet adapted to be connected to a supply receptacle, a lower tank having an outlet adapted to be connected to a receptacle to be supplied, an open-ended pipe connecting said tanks and having its upper end located above the level of the liquid in the upper tank and its lower end located below the level of the liquid in the lower tank, a float located in the lower tank and movable with the rise and fall of the liquid therein, an upright rod carried by the float and extending upward within said pipe, and a siphon carried by said rod and having its outer and inner legs located respectively in the upper tank and in the upper end of said pipe.

4. An apparatus of the character described, comprising an upper tank having its top portion closed and also having an inlet adapted to be connected to a supply receptacle, a lower tank having an outlet adapted to be connected to a receptacle to be supplied, an open-ended pipe connecting said tanks and having its upper end located above the level of the liquid in the upper tank and its lower end located below the level of the liquid in the lower tank, a float movable with the rise and fall of the liquid in the lower tank, and a siphon carried by said float and arranged to convey liquid from the upper tank into said pipe, the lower end of said pipe being provided with a downwardly-facing funnel.

5. An apparatus of the character described, comprising an upper tank having its top portion closed and also having an inlet adapted to be connected to a supply receptacle, a lower tank having an outlet adapted to be connected to a receptacle to be supplied, an open-ended pipe connecting said tanks and having its upper end located above the level of the liquid in the upper tank and its lower end located below the level of the liquid in the lower tank, a float movable with the rise and fall of the liquid in the lower tank, a siphon carried by said float and arranged to convey liquid from the upper tank into said pipe, and means for vertically adjusting the siphon and float with respect to each other.

6. An apparatus of the character described, comprising an upper tank having its top portion closed and also having an inlet adapted to be connected to a supply receptacle, a lower tank having an outlet adapted to be connected to a receptacle to be supplied, an open-ended pipe connecting said tanks and having its upper end located above the level of the liquid in the upper tank and its lower end located below the level of the liquid in the lower tank, a float located in the lower tank and movable with the rise and fall of the liquid therein, a supporting rod carried by the float and extending upward within said pipe, and a siphon carried by said rod and having its outer and inner legs located respectively in the upper tank and in the upper end of said pipe, the legs of said siphon being upturned at their lower ends.

7. An apparatus of the character described, comprising an upper tank having an opening in its top and a detachable cap normally closing the same, said tank being provided with an inlet adapted to be connected to a supply receptacle, a lower tank having an outlet adapted to be connected to a receptacle to be supplied, an open-ended pipe connecting said tanks and having its upper end located above the level of the liquid in the upper tank and its lower end located below the level of the liquid in the lower tank, a float located in the lower tank and movable with the rise and fall of the liquid therein, an upright rod carried by the float and extending upward within said pipe, and a siphon detachably secured to the upper end of said rod and removable through the opening in the top of the upper tank, with its outer and inner legs located respectively in the upper tank and in the upper end of said pipe.

8. An apparatus of the character described, comprising an upper tank having an opening in its top and a detachable cap normally closing the same, said tank being provided with an inlet adapted to be connected to a supply receptacle, a lower tank having an outlet adapted to be connected to a receptacle to be supplied, an open-ended pipe connecting said tanks and having its upper end located above the level of the liquid in the upper tank and its lower end located below the level of the liquid in the lower tank, a float located in the lower tank and movable with the rise and fall of the liquid therein, an upright rod carried by the float and extending upward within said pipe, and a siphon detachably secured to the upper end of said rod and having its outer and inner legs located respectively in the upper tank and in the upper end of said pipe, said siphon being removable through the opening in the top of the upper tank and having its legs upturned at their lower ends.

9. An apparatus of the character described, comprising a supply receptacle, a receptacle to be supplied, an upper tank having its top portion closed and also having an inlet located near its bottom and connected to the supply receptacle by an open pipe, a lower tank having an outlet connected by an open pipe to the receptacle to be supplied, an open-ended pipe connecting said tanks and having its upper end located above the inlet to the upper tank and its lower end located below the outlet from the lower tank, a float movable with the rise and fall of the liquid in the lower tank, and a siphon carried by said float and arranged to convey liquid from the upper tank into said pipe.

10. An apparatus of the character described, comprising a supply receptacle, a receptacle to be supplied, an upper tank having its top portion closed and also having an inlet located near its bottom and connected to the supply receptacle by an open pipe, a lower tank having an outlet connected by an open pipe to the receptacle to be supplied, an open-ended pipe connecting said tanks and having its upper end located above the inlet to the upper tank and its lower end located below the outlet from the lower tank, a float located in the lower tank and movable with the rise and fall of the liquid therein, an upright rod carried by the float and extending upward within said pipe, a siphon carried by said rod and having its outer and inner legs located respectively in the upper tank and in the upper end of said pipe, and means for vertically adjusting the siphon and float with respect to each other.

11. An apparatus of the character described, comprising a supply receptacle, a receptacle to be supplied, an upper tank having an opening in its top and also having an inlet located near its bottom and connected to the supply receptacle by an open pipe, a lower tank having an outlet connected by an open pipe to the receptacle to be supplied, an open-ended pipe connecting said tanks and having its upper end located beneath the opening in the top of the upper tank and below the outlet from said tank, the lower end of said pipe being located below the outlet from the lower tank, a float located in the lower tank and movable with the rise and fall of the liquid therein, an upright rod carried by the float and extending upward within said pipe, a siphon detachably secured to the upper end of said rod and having its outer and inner legs upturned at their lower ends and located respectively in the upper tank and in the upper end of said pipe, means for vertically adjusting the siphon and float with respect to each other, and a detachable cap normally closing the opening in the top of the upper tank.

Signed at Detroit, Michigan, this 4th day of November, 1916.

LOT A. HUFFERD.

Copies of this patent may be obtained for five cents each, by addressing the "Commissioner of Patents, Washington, D. C."